United States Patent
Tanaka et al.

(10) Patent No.: US 12,509,423 B2
(45) Date of Patent: Dec. 30, 2025

(54) COMPOUND, ALDEHYDE DEHYDROGENASE 2 ACTIVATING AGENT, PHARMACEUTICAL COMPOSITION, AND THERAPEUTIC AND/OR PROPHYLACTIC DRUG

(71) Applicant: Alchemedicine, Inc., Tsukuba (JP)

(72) Inventors: Keigo Tanaka, Tsukuba (JP); Tomohisa Ninomiya, Tsukuba (JP)

(73) Assignee: ALCHEMEDICINE, INC., Ibaraki (JP)

( * ) Notice: Subject to any disclaimer, the term of this patent is extended or adjusted under 35 U.S.C. 154(b) by 322 days.

(21) Appl. No.: 18/021,282

(22) PCT Filed: Nov. 1, 2021

(86) PCT No.: PCT/JP2021/040218
§ 371 (c)(1),
(2) Date: Feb. 14, 2023

(87) PCT Pub. No.: WO2022/092310
PCT Pub. Date: May 5, 2022

(65) Prior Publication Data
US 2023/0295091 A1   Sep. 21, 2023

(30) Foreign Application Priority Data
Nov. 2, 2020 (JP) .................. 2020-183782

(51) Int. Cl.
C07D 213/56 (2006.01)
A61P 29/00 (2006.01)
C07D 231/12 (2006.01)
C07F 9/58 (2006.01)

(52) U.S. Cl.
CPC ............ *C07D 213/56* (2013.01); *A61P 29/00* (2018.01); *C07D 231/12* (2013.01); *C07F 9/58* (2013.01)

(58) Field of Classification Search
CPC ....... C07D 213/56; C07D 231/12; C07F 9/58; C07F 9/09; A61K 31/415; A61K 31/4418; A61K 31/661; A61K 31/675
See application file for complete search history.

(56) References Cited

U.S. PATENT DOCUMENTS

2019/0231720 A1   8/2019   Tanaka et al.

FOREIGN PATENT DOCUMENTS

| CN | 106458910 A | 2/2017 | |
|---|---|---|---|
| JP | 2016-514154 A | 5/2016 | |
| JP | 2017-507147 A | 3/2017 | |
| WO | WO-2006114409 A1 * | 11/2006 | ........... C07D 405/12 |
| WO | WO 2008/112164 A2 | 9/2008 | |
| WO | WO 2014/160185 A2 | 10/2014 | |
| WO | WO 2015/127137 A1 | 8/2015 | |
| WO | WO 2019/151241 A1 | 8/2019 | |
| WO | WO 2020/076974 A | 4/2020 | |

OTHER PUBLICATIONS

International Search Report for PCT/JP2021/040218; I.A. fd Nov. 1, 2021, mailed Dec. 28, 2021, by the Japan Patent Office, Tokyo, Japan.
International Preliminary Report on Patentability (IPRP), Chapter I of the Patent Cooperation Treaty, including the Written Opinion for PCT/JP2021/040218; I.A. fd Nov. 1, 2021, issued May 2, 2023, by the International Bureau of WIPO, Geneva, Switzerland.
Hira A, et al., "Variant ALDH2 is associated with accelerated progression of bone marrow failure in Japanese Fanconi anemia patients." Blood. Oct. 31, 2013;122(18):3206-9. doi: 10.1182/blood-2013-06-507962. Epub Sep. 13, 2013. PMID: 24037726; PMCID: PMC3953058.
Hoshi H, et al., "Aldehyde-stress resulting from Aldh2 mutation promotes osteoporosis due to impaired osteoblastogenesis." J Bone Miner Res. Sep. 2012;27(9):2015-23. doi: 10.1002/jbmr.1634. Published online Apr. 16, 2012. PMID: 22508505.
Oniki K, et al., "The longitudinal effect of the *aldehyde dehydrogenase 2*2* allele on the risk for nonalcoholic fatty liver disease." Nutr Diabetes. May 23, 2016;6(5):e210. doi: 10.1038/nutd.2016.17. Published online May 23, 2016. PMID: 27214654; PMCID: PMC4895378.
Chen L, et al., "Vinyl chloride-induced interaction of nonalcoholic and toxicant-associated steatohepatitis: Protection by the ALDH2 activator Alda-1." Redox Biol. Jun. 2019;24:101205. doi: 10.1016/j.redox.2019.101205. Epub Apr. 19, 2019. PMID: 31026768; PMCID: PMC6479707.
Guo R, et al., "Aldehyde dedydrogenase-2 plays a beneficial role in ameliorating chronic alcohol-induced hepatic steatosis and inflammation through regulation of autophagy." J Hepatol. Mar. 2015;62(3):647-56. doi: 10.1016/j.jhep.2014.10.009. Epub Oct. 20, 2014. PMID: 25457208; PMCID: PMC4336638.

(Continued)

*Primary Examiner* — Rayna Rodriguez
(74) *Attorney, Agent, or Firm* — Sterne, Kessler, Goldstein & Fox P.L.L.C.

(57) ABSTRACT

Provided is a compound and so on having aldehyde dehydrogenase 2 (ALDH2) activation effect. A compound, a pharmaceutically acceptable salt of the compound, or a prodrug of the compound or the salt, the compound being represented by the following formula (1):

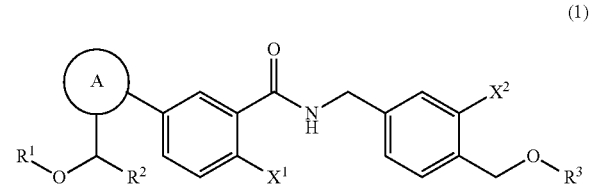

(1)

wherein
A is a heterocycle,
$R^1$ and $R^2$ are each independently hydrogen, an alkyl, an alkenyl, or an alkynyl,
$R^3$ is an alkyl, an alkenyl, or an alkynyl, and
$X^1$ and $X^2$ are each independently a halogen.

16 Claims, No Drawings

(56) References Cited

OTHER PUBLICATIONS

Cao S, et al., "A small-molecule activator of mitochondrial aldehyde dehydrogenase 2 reduces the severity of cerulein-induced acute pancreatitis." Biochem Biophys Res Commun. Feb. 5, 2020;522(2):518-524. doi: 10.1016/j.bbrc.2019.11.128. Epub Nov. 26, 2019. PMID: 31784085.

Ueta CB, et al., ". Disruption of mitochondrial quality control in peripheral artery disease: New therapeutic opportunities." Pharmacol Res. Jan. 2017;115:96-106. doi: 10.1016/j.phrs.2016.11.016. Epub Nov. 19, 2016. PMID: 27876411; PMCID: PMC5205542.

Kamino K, et al., "Deficiency in mitochondrial aldehyde dehydrogenase increases the risk for late-onset Alzheimer's disease in the Japanese population." Biochem Biophys Res Commun. Jun. 24, 2000;273(1):192-6. doi: 10.1006/bbrc.2000.2923. PMID: 10873585.

Fitzmaurice AG, et al., "Aldehyde dehydrogenase variation enhances effect of pesticides associated with Parkinson disease". Neurology. Feb. 4, 2014;82(5):419-26. doi: 10.1212/WNL.0000000000000083 and Erratum published in Neurology. Nov. 11, 2014;83(20):1880. PMID: 24491970; PMCID: PMC3917685.

Katada C, et al., "Alcohol Consumption and Multiple Dysplastic Lesions Increase Risk of Squamous Cell Carcinoma in the Esophagus, Head, and Neck." Gastroenterology. Nov. 2016;151(5):860-869.e7. doi: 10.1053/j.gastro.2016.07.040. Epub Aug. 1, 2016. PMID: 27492616.

Hirohashi K, et al., "Protective effects of Alda-1, an ALDH2 activator, on alcohol-derived DNA damage in the esophagus of human ALDH2*2 (Glu504Lys) knock-in mice." Carcinogenesis. Apr. 22, 2020;41(2):194-202. doi: 10.1093/carcin/bgz091. PMID: 31074772; PMCID: PMC7175241.

Hiyama T, et al., "Genetic polymorphisms and head and neck cancer risk (Review)." Int J Oncol. May 2008;32(5):945-73. PMID: 18425322.

Zambelli Vo, et al., "Aldehyde dehydrogenase-2 regulates nociception in rodent models of acute inflammatory pain." Sci Transl Med. Aug. 27, 2014;6(251):251ra118. doi: 10.1126/scitranslmed. 3009539. PMID: 25163478; PMCID: PMC4234033.

\* cited by examiner

COMPOUND, ALDEHYDE DEHYDROGENASE 2 ACTIVATING AGENT, PHARMACEUTICAL COMPOSITION, AND THERAPEUTIC AND/OR PROPHYLACTIC DRUG

BACKGROUND OF THE INVENTION

Field of the Invention

The present invention relates to a compound, an aldehyde dehydrogenase 2 activating agent, a pharmaceutical composition, and a therapeutic and/or prophylactic drug.

Description of the Related Art

Aldehyde dehydrogenase 2 (ALDH2) is an enzyme that decomposes aldehydes such as acetaldehyde, and has been reported to have relationship with various diseases (e.g., Fanconi's anemia, osteoporosis, nonalcoholic fatty liver disease (NAFLD), nonalcoholic steatohepatitis (NASH), alcoholic hepatopathy, pancreatitis, ischemia-reperfusion injury, peripheral arterial disease, Alzheimer's disease, Parkinson's disease, esophageal cancer, head and neck cancer, and pain).

Fanconi's anemia (FA) is a hereditary bone marrow failure disorder and involves symptoms including aplastic anemia, leukemia, carcinoma, and malformation. It is important for stem cells that produce blood in the bone marrow to properly decompose aldehyde and repair a damaged genome; however, it has been reported that FA patients are incapable of repairing genomic disorder caused by aldehyde, allowing the progression of anemia (e.g., Blood (2013) 122 (18): 3206-3209).

It has been reported with regard to the relationship with osteoporosis that ALDH2 gene mutation model mice exhibit symptoms of osteoporosis, which lead to a reduction in bone density; the osteoblasts of the model mice show significantly decreased differentiation/formation capability; and osteoblasts with ALDH2 gene mutation show decreased formation capability also in humans (e.g., Journal of Bone and Mineral Research (2012) 27 (9): 2015-2023).

NAFLD and NASH develop through the accumulation of triglyceride in the liver with the background of metabolic disease, and it has been reported that the incidence rate of NAFLD is high in humans having a genotype of low ALDH2 activity (e.g., Nutrition & Diabetes (2016) 6, e210). Alcoholic hepatopathy and pancreatitis are caused by overdrinking, and acetaldehyde generated by the decomposition of ethanol in the living body is believed to be the primary cause. In addition, it has been reported that in pathological models of NAFLD, NASH, alcoholic hepatopathy, and pancreatitis, the pathological condition is ameliorated by an ALDH2 activator compound or introduction of an ALDH2 gene (e.g., Redox Biology (2019) 24: 101205, Journal of Hepatology (2015) 62: 647-656, and Biochemical and Biophysical Research Communications (2020) 522: 518-524).

Ischemia-reperfusion injury is a histological disorder caused by reinitiation of blood supply after continuous ischemic condition due to arterial occlusion in an organ. ALDH2 activator compounds have been reported to be effective for protection against ischemia-reperfusion injury (e.g., International Publication No. WO 2008/112164). In addition, the relationship between peripheral arterial disease and ALDH2 has been suggested (e.g., Pharmacological Research (2017) 115: 96-106).

Alzheimer's disease and Parkinson's disease are cryptogenic neurodegenerative diseases, and it has been reported that drinking and ALDH2 gene mutation contribute to the onset and progression of the pathological condition (e.g., Biochemical and Biophysical Research Communications (2000) 273: 192-196 and Neurology (2014) 82: 419-426).

Smoking, drinking, and excess intake of hot drinks or foods are believed to be the risk factors of esophageal cancer, and the International Agency for Research on Cancer (IARC) has recognized alcoholic beverages as carcinogens for esophageal squamous cell carcinoma since 2010. Analysis of patients with esophageal cancer and those with head and neck cancer has suggested that alcohol abstinence possibly suppresses the progression of esophageal cancer, and it has been reported that DNA disorder in the esophagus is more strongly caused by drinking in mice with a knocked-in human ALDH2 gene with mutation of low activity; thus, the relationship between esophageal cancer and drinking and ALDH2 has been reported (e.g., Gastroenterology (2016) 151: 860-869 and -Carcinogenesis (2020) 41: 194-202). Similarly, the relationship between head and neck cancer and ALDH2 has been reported (e.g., International Journal of Oncology (2008) 32: 945-973).

Inflammatory (injury-induced), neuropathic, and cryptogenic pains are mainly known as pain, and it has been reported that in an inflammatory pain model using mice, mice with introduced ALDH2 mutation are more sensitive to pain stimulation, and this tendency is canceled by an ALDH2 activator compound (e.g., Science Translational Medicine (2014) 6: 251ra118).

Since relationships between ALDH2 and various diseases have been reported as described above, activation of ALDH2 is expected to be effective for the treatment and/or prevention of such diseases. For example, compounds described in International Publication Nos. WO 2008/112164, WO 2014/160185, WO 2015/127137, and WO 2019/151241 are known as compounds having activation effects for ALDH2.

Related Art Literatures

Patent Literature 1: WO 2008/112164
Patent Literature 2: WO 2014/160185
Patent Literature 3: WO 2015/127137
Patent Literature 4: WO 2019/151241
Non-Patent Literature 1: Blood (2013) 122 (18): 3206-3209
Non-Patent Literature 2: Journal of Bone and Mineral Research (2012) 27 (9): 2015-2023
Non-Patent Literature 3: Nutrition & Diabetes (2016) 6, e210
Non-Patent Literature 4: Redox Biology (2019) 24: 101205
Non-Patent Literature 5: Journal of Hepatology (2015) 62: 647-656
Non-Patent Literature 6: Biochemical and Biophysical Research Communications (2020) 522: 518-524
Non-Patent Literature 7: Pharmacological Research (2017) 115: 96-106
Non-Patent Literature 8: Biochemical and Biophysical Research Communications (2000) 273: 192-196
Non-Patent Literature 9: Neurology (2014) 82: 419-426
Non-Patent Literature 10: Gastroenterology (2016) 151: 860-869
Non-Patent Literature 11: Carcinogenesis (2020) 41: 194-202
Non-Patent Literature 12: International Journal of Oncology (2008) 32: 945-973

Non-Patent Literature 13: Science Translational Medicine (2014) 6: 251ra118

SUMMARY OF THE INVENTION

Technical Problem

An object of the present invention is to provide a compound having an ALDH2 activation effect, or an ALDH2 activating agent, a pharmaceutical composition, or a therapeutic or prophylactic drug containing the compound.

Solution to Problem

The present inventors diligently examined, and as a result found that compounds of the specific structure have ALDH2 activation effect, thus completing the present invention.

The present invention includes the following embodiments.

[1] A compound, a pharmaceutically acceptable salt of the compound, or a prodrug of the compound or the salt, the compound being represented by the following formula (1):

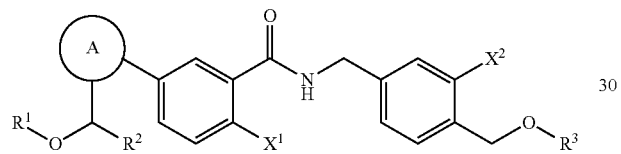

(1)

wherein
A is a heterocycle,
$R^1$ and $R^2$ are each independently hydrogen, an alkyl, an alkenyl, or an alkynyl,
$R^3$ is an alkyl, an alkenyl, or an alkynyl, and
$X^1$ and $X^2$ are each independently a halogen.

[2] The compound, the pharmaceutically acceptable salt of the compound, or the prodrug of the compound or the salt according to [1], wherein A contains at least one nitrogen atom as a ring member atom.

[3] The compound, the pharmaceutically acceptable salt of the compound, or the prodrug of the compound or the salt according to [1] or [2], wherein A is a five- or six-membered ring.

[4] The compound, the pharmaceutically acceptable salt of the compound, or the prodrug of the compound or the salt according to any one of [1] to [3], wherein A is an aromatic heterocycle.

[5] The compound, the pharmaceutically acceptable salt of the compound, or the prodrug of the compound or the salt according to any one of [1] to [4], wherein the compound represented by the formula (1) is a compound represented by the following formula (2) or (3):

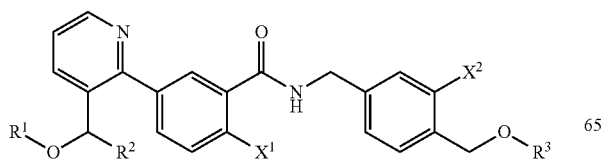

(2)

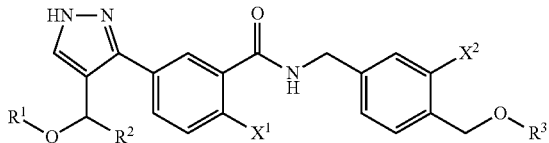

(3)

wherein $R^1$, $R^2$, $R^3$, $X^1$, and $X^2$ are as described above.

[6] The compound, the pharmaceutically acceptable salt of the compound, or the prodrug of the compound or the salt according to any one of [1] to [5], wherein $R^1$ is hydrogen or an alkyl.

[6-1] The compound, the pharmaceutically acceptable salt of the compound, or the prodrug of the compound or the salt according to any one of [1] to [6], wherein $R^1$ is hydrogen or methyl.

[6-2] The compound, the pharmaceutically acceptable salt of the compound, or the prodrug of the compound or the salt according to any one of [1] to [6-1], wherein $R^1$ is hydrogen.

[7] The compound, the pharmaceutically acceptable salt of the compound, or the prodrug of the compound or the salt according to any one of [1] to [6-2], wherein $R^2$ is hydrogen or an alkyl.

[7-1] The compound, the pharmaceutically acceptable salt of the compound, or the prodrug of the compound or the salt according to any one of [1] to [7], wherein $R^2$ is hydrogen or methyl.

[7-2] The compound, the pharmaceutically acceptable salt of the compound, or the prodrug of the compound or the salt according to any one of [1] to [7-1], wherein $R^2$ is hydrogen.

[8] The compound, the pharmaceutically acceptable salt of the compound, or the prodrug of the compound or the salt according to any one of [1] to [7-2], wherein $R^3$ is an alkyl substituted with a halogen, an unsubstituted alkyl.

[8-1] The compound, the pharmaceutically acceptable salt of the compound, or the prodrug of the compound or the salt according to any one of [1] to [8], wherein $R^3$ is methyl substituted with fluorine, or unsubstituted methyl.

[8-2] The compound, the pharmaceutically acceptable salt of the compound, or the prodrug of the compound or the salt according to any one of [1] to [8-1], wherein $R^3$ is unsubstituted methyl.

[9] The compound, the pharmaceutically acceptable salt of the compound, or the prodrug of the compound or the salt according to any one of [1] to [8-2], wherein $X^1$ is fluorine or chlorine.

[10] The compound, the pharmaceutically acceptable salt of the compound, or the prodrug of the compound or the salt according to any one of [1] to [9], wherein $X^2$ is fluorine.

[11] The compound, the pharmaceutically acceptable salt of the compound, or the prodrug of the compound or the salt according to any one of [1] to [10], wherein the compound represented by the formula (1) is selected from the group consisting of the following compounds:

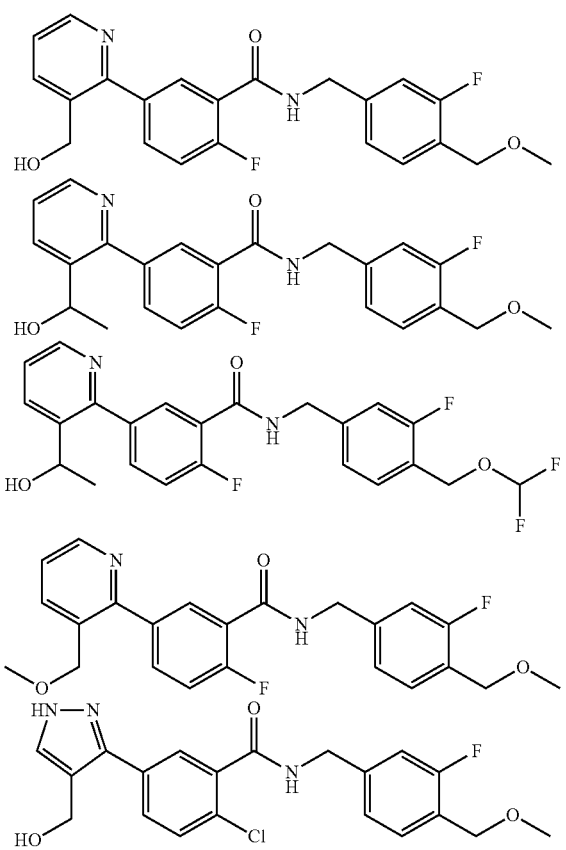

[12] The prodrug according to any one of [1] to [11] or a pharmaceutically acceptable salt of the prodrug, wherein R¹ is —CH₂—O—PO₃H₂.

[13] The prodrug according to any one of [1] to [11] or a pharmaceutically acceptable salt of the prodrug, wherein A contains at least one nitrogen atom as a ring member atom, and at least one of the nitrogen atom is substituted with —CH₂—O—PO₃H₂.

[14] The prodrug or the pharmaceutically acceptable salt of the prodrug according to any one of [1] to [13], wherein the prodrug or the pharmaceutically acceptable salt of the prodrug is selected from the group consisting of the following compounds:

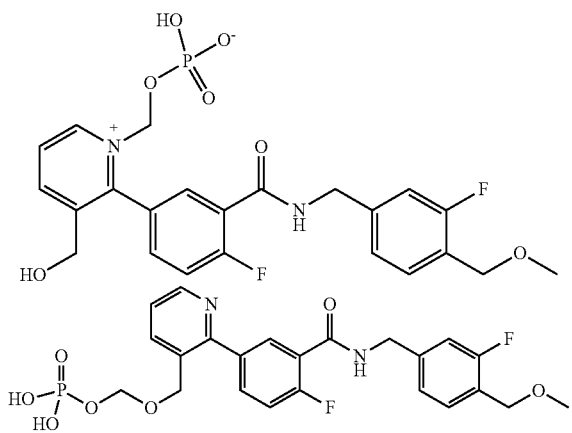

[15] An aldehyde dehydrogenase 2 activating agent containing the compound, the pharmaceutically acceptable salt of the compound, or the prodrug of the compound or the salt according to any one of [1] to [14].

[16] A pharmaceutical composition containing the compound, the pharmaceutically acceptable salt of the compound, or the prodrug of the compound or the salt according to any one of [1] to [14].

[17] A therapeutic and/or prophylactic drug containing the compound, the pharmaceutically acceptable salt of the compound, or the prodrug of the compound or the salt according to any one of [1] to [14] for a disease selected from the group consisting of Fanconi's anemia, osteoporosis, nonalcoholic fatty liver disease (NAFLD), nonalcoholic steatohepatitis (NASH), alcoholic hepatopathy, pancreatitis, ischemia-reperfusion injury, peripheral arterial disease, Alzheimer's disease, Parkinson's disease, esophageal cancer, head and neck cancer, and pain.

[A1] A method for activating aldehyde dehydrogenase 2, the method including administering an effective amount of the compound, the pharmaceutically acceptable salt of the compound, or the prodrug of the compound or the salt according to any one of [1] to [14] to a patient in need thereof.

[A2] A method for treating and/or preventing a disease selected from the group consisting of Fanconi's anemia, osteoporosis, nonalcoholic fatty liver disease (NAFLD), nonalcoholic steatohepatitis (NASH), alcoholic hepatopathy, pancreatitis, ischemia-reperfusion injury, peripheral arterial disease, Alzheimer's disease, Parkinson's disease, esophageal cancer, head and neck cancer, and pain, the method including administering an effective amount of the compound, the pharmaceutically acceptable salt of the compound, or the prodrug of the compound or the salt according to any one of [1] to [14] to a patient in need thereof.

[B1] The compound, the pharmaceutically acceptable salt of the compound, or the prodrug of the compound or the salt according to any one of [1] to [14] for use in the activation of aldehyde dehydrogenase 2.

[B2] The compound, the pharmaceutically acceptable salt of the compound, or the prodrug of the compound or the salt according to any one of [1] to [14] for use in the treatment and/or prevention of a disease selected from the group consisting of Fanconi's anemia, osteoporosis, nonalcoholic fatty liver disease (NAFLD), nonalcoholic steatohepatitis (NASH), alcoholic hepatopathy, pancreatitis, ischemia-reperfusion injury, peripheral arterial disease, Alzheimer's disease, Parkinson's disease, esophageal cancer, head and neck cancer, and pain.

[C1] Use of the compound, the pharmaceutically acceptable salt of the compound, or the prodrug of the compound or the salt according to any one of [1] to [14] for activating aldehyde dehydrogenase 2.

[C2] Use of the compound, the pharmaceutically acceptable salt of the compound, or the prodrug of the compound or the salt according to any one of [1] to [14] for treating and/or preventing a disease selected from the group consisting of Fanconi's anemia, nonalcoholic fatty liver disease (NAFLD), nonalcoholic steatohepatitis (NASH), alcoholic hepatopathy, pancreatitis, ischemia-reperfusion injury, peripheral arterial disease, Alzheimer's disease, Parkinson's disease, esophageal cancer, head and neck cancer, and pain.

[D1] Use of the compound, the pharmaceutically acceptable salt of the compound, or the prodrug of the compound or the salt according to any one of [1] to [14] in production of an aldehyde dehydrogenase 2 activating agent.

[D2] Use of the compound, the pharmaceutically acceptable salt of the compound, or the prodrug of the compound or the salt according to any one of [1] to [14] in production of a therapeutic and/or prophylactic drug for a disease selected from the group consisting off Fanconi's anemia, osteoporosis, nonalcoholic fatty liver disease (NAFLD), nonalcoholic steatohepatitis (NASH), alcoholic hepatopathy, pancreatitis, ischemia-reperfusion injury, peripheral arterial disease, Alzheimer's disease, Parkinson's disease, esophageal cancer, head and neck cancer, and pain.

Advantageous Effects of the Invention

The present invention can provide a compound having ALDH2 activation effect, or an ALDH2 activating agent, a pharmaceutical composition, or a therapeutic or prophylactic drug containing the compound.

DETAILED DESCRIPTION OF THE PREFERRED EMBODIMENTS

Hereinafter, embodiments of the present invention will be specifically described; however, the present invention is not limited thereto, and various modifications can be made without departing from the spirit of the present invention.
<Compound>

An embodiment of the present invention relates to a compound, a pharmaceutically acceptable salt of the compound, or a prodrug of the compound or the salt, the compound being represented by the following formula (1):

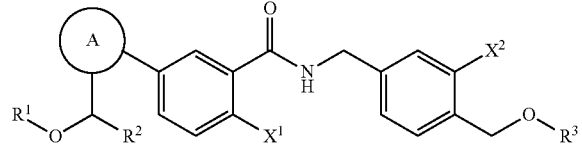

(1)

wherein
A is a heterocycle,
$R^1$ and $R^2$ are each independently hydrogen, an alkyl, an alkenyl, or an alkynyl, $R^3$ is an alkyl, an alkenyl, or an alkynyl, and
$X^1$ and $X^2$ are each independently a halogen.

In the formula (1), it is preferable that A contain at least one nitrogen atom as a ring member atom. It is preferable that A be a five- or six-membered ring. It is preferable that A be an aromatic heterocycle. It is preferable that A be a pyridine ring or a pyrazole ring, though A is not limited thereto.

In the formula (1), the alkyl, alkenyl, and alkynyl of $R^1$ to $R^3$ may be linear or branched. The alkyl, alkenyl, and alkynyl of $R^1$ to $R^3$ may be substituted with a substituent or unsubstituted. Examples of the substituent can include halogens (fluorine, chlorine, bromine, or iodine). If substituents are present, the number of the substituents can be, for example, one, two, or three.

In the formula (1), the alkyls of $R^1$ to $R^3$ are preferably each independently an alkyl having one to six carbon atoms, more preferably each independently an alkyl having one to three carbon atoms, and further preferably each independently methyl. The alkenyls of $R^1$ to $R^3$ are preferably each independently an alkenyl having two to six carbon atoms, and more preferably each independently an alkenyl having two to four carbon atoms. The alkynyls of $R^1$ to $R^3$ are preferably each independently an alkynyl having two to six carbon atoms, and more preferably each independently an alkynyl having two to four carbon atoms.

In the formula (1), for ALDH2 activity and metabolic stability, $R^1$ is preferably hydrogen or an alkyl, more preferably hydrogen or methyl, and further preferably hydrogen.

In the formula (1), for ALDH2 activity and metabolic stability, $R^2$ is preferably hydrogen or an alkyl, more preferably hydrogen or methyl, and further preferably hydrogen.

In the formula (1), for metabolic stability, $R^3$ is preferably an alkyl substituted with a halogen, or an unsubstituted alkyl, more preferably methyl substituted with fluorine, or unsubstituted methyl, and further preferably unsubstituted methyl.

In the formula (1), $X^1$ is preferably fluorine, chlorine, bromine, or iodine, more preferably fluorine or chlorine, and further preferably fluorine.

In the formula (1), $X^2$ is preferably fluorine, chlorine, bromine, or iodine, more preferably fluorine or chlorine, and further preferably fluorine.

It is preferable that the compound represented by the formula (1) be a compound represented by the following formula (2) or (3):

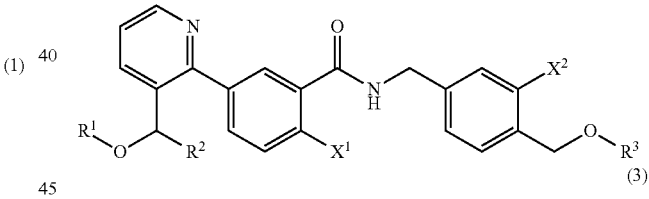

(2)

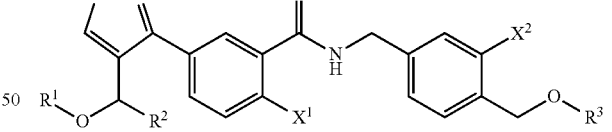

(3)

wherein $R^1$, $R^2$, $R^3$, $X^1$, and $X^2$ are as described above, though the compound represented by the formula (1) is not limited thereto.

It is preferable that the compound represented by the formula (1) be any of the following compounds:

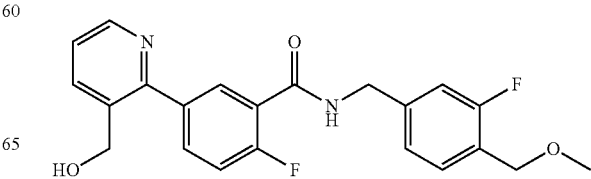

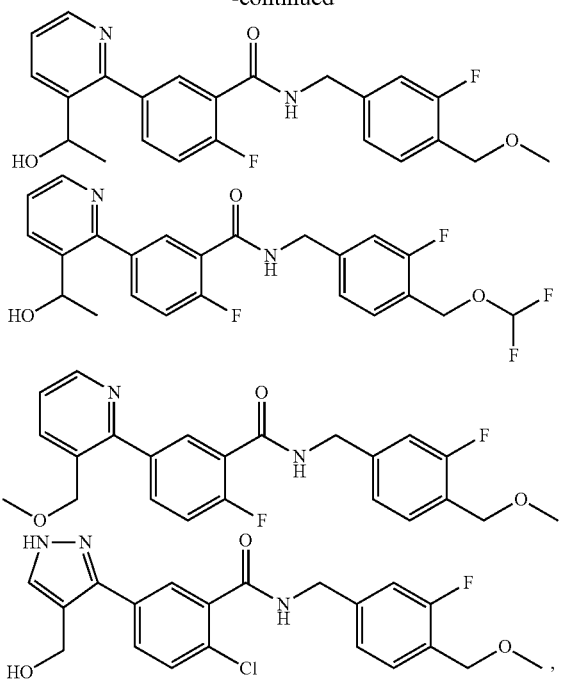

though the compound represented by the formula (1) is not limited thereto.

Examples of the prodrug of the above compound can include phosphorylated prodrugs, more specifically, a compound in which $R^1$ is —$CH_2$—O—$PO_3H_2$, and a compound in which at least one of the nitrogen atom(s) as ring member atom(s) of A is substituted with —$CH_2$—O—$PO_3H_2$.

It is preferable that the prodrug or the pharmaceutically acceptable salt of the prodrug be any of the following compounds:

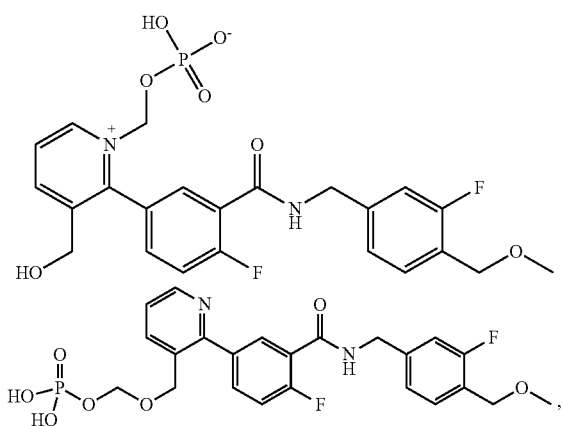

though the prodrug or the pharmaceutically acceptable salt of the prodrug is not limited thereto.

The pharmaceutically acceptable salt of the compound or the prodrug is not limited and may be any salt that is applicable to medicaments, and examples thereof include inorganic acid salts such as hydrochloride salts, sulfate salts, nitrate salts, phosphate salts, and hydrobromide salts; organic acid salts such as fumarate salts, maleate salts, malate salts, tartrate salts, succinate salts, citrate salts, methanesulfonate salts, p-toluenesulfonate salts, acetate salts, lactate salts,- and palmitate salts; alkali metal salts; and alkali earth metal salts.

The compound, the pharmaceutically acceptable salt of the compound, or the prodrug of the compound or the salt may be forming a solvate such as a hydrate. Herein, such a solvate is encompassed by the scope of the compound, the pharmaceutically acceptable salt of the compound, or the prodrug of the compound or the salt.

If stereoisomers (e.g., enantiomers, diastereomers) are present for the compound, the pharmaceutically acceptable salt of the compound, or the prodrug of the compound or the salt, each of the stereoisomers and any mixture of them (e.g., racemates) are encompassed by the scope of the compound, the pharmaceutically acceptable salt of the compound, or the prodrug of the compound or the salt.

<Aldehyde Dehydrogenase 2 Activating Agent>

An embodiment of the present invention relates to an ALDH2 activating agent containing the compound, the pharmaceutically acceptable salt of the compound, or the prodrug of the compound or the salt as described above. The ALDH2 activating agent of the present embodiment is not only excellent in the ALDH2 activation effect but also further has excellent characteristics (e.g., excellent metabolic stability, prevention of generation of reactive metabolites, avoidance of inhibition of hERG).

The use of the ALDH2 activating agent of the present embodiment enables treatment and/or prevention of diseases associated with ALDH2.

<Pharmaceutical Composition and Therapeutic and/or Prophylactic Drug>

An embodiment of the present invention relates to a pharmaceutical composition containing the compound, the pharmaceutically acceptable salt of the compound, or the prodrug of the compound or the salt as described above. An embodiment of the present invention relates to a therapeutic and/or prophylactic drug containing the compound, the pharmaceutically acceptable salt of the compound, or the prodrug of the compound or the salt as described above.

Examples of the diseases targeted by the pharmaceutical composition and the therapeutic and/or prophylactic drug of the present embodiments include Fanconi's anemia, osteoporosis, nonalcoholic fatty liver disease (NAFLD), nonalcoholic steatohepatitis (NASH), alcoholic hepatopathy, pancreatitis, ischemia-reperfusion injury, peripheral arterial disease, Alzheimer's disease, Parkinson's disease, esophageal cancer, head and neck cancer, and pain.

The pharmaceutical composition and the therapeutic and/or prophylactic drug of the present embodiments can be administered orally or parenterally. Examples of dosage forms for oral administration include tablets, pills, granules, powders, capsules, syrups, emulsions, and suspensions. Examples of dosage forms for parenteral administration include injections, infusions, drip infusions, eye drops, and -suppositories.

The pharmaceutical composition and the therapeutic and/or prophylactic drug of the present embodiments may contain, as necessary, an excipient, a binder, a lubricant, a disintegrant, a sweetener, a surfactant, a suspending agent, an emulsifier, a colorant, a preservative, a fragrance, a flavoring agent, a stabilizer, a thickener, and so on.

The dose (based on the active ingredient) of the pharmaceutical composition and the therapeutic and/or prophylactic drug of the present embodiments varies depending on the condition and body weight of the patient, the type of the compound, the type of the disease, the route of administration, and so on, though physicians can determine an appropriate quantity. In an example for treating Fanconi's anemia, osteoporosis, nonalcoholic fatty liver disease (NAFLD), nonalcoholic steatohepatitis (NASH), alcoholic hepatopathy, pancreatitis, ischemia-reperfusion injury, peripheral arterial disease, Alzheimer's disease, Parkinson's disease, esophageal cancer, head and neck cancer, or pain, 1 to 2000 (mg) may be administered to an adult (body weight: approximately 60 kg) for oral administration, and 0.01 to 200 (mg) may be administered to an adult for parenteral administration.

<Production Method for Compound>

The compound or the pharmaceutically acceptable salt of the compound as described above can be synthesized by appropriately using a known method. The synthesis method can be, in an example, scheme A in the following:

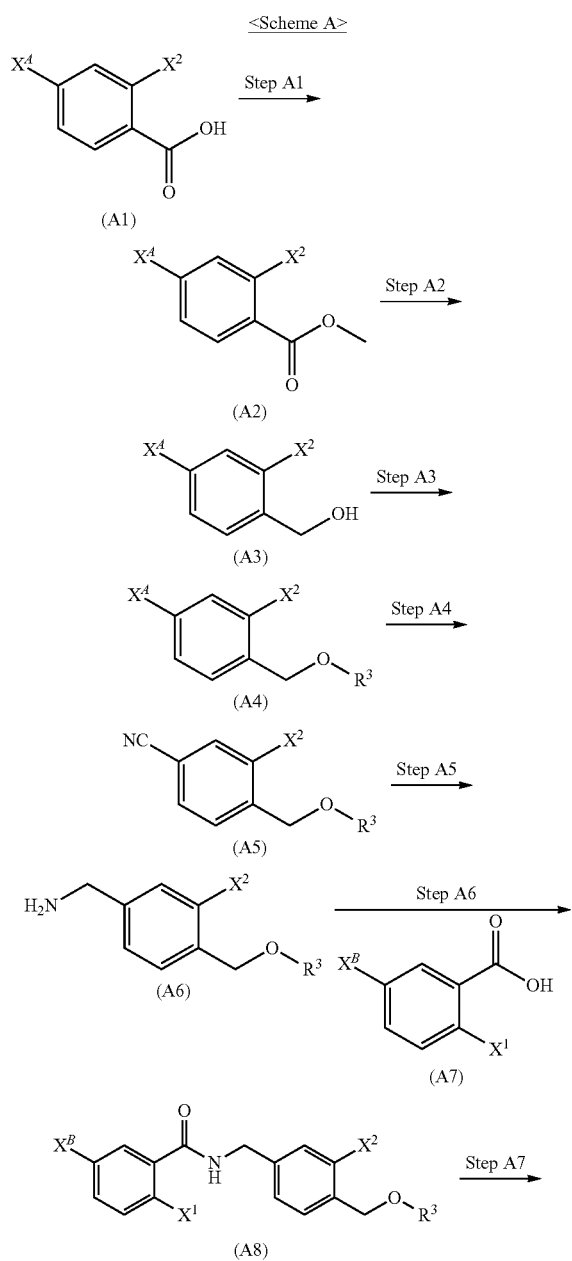

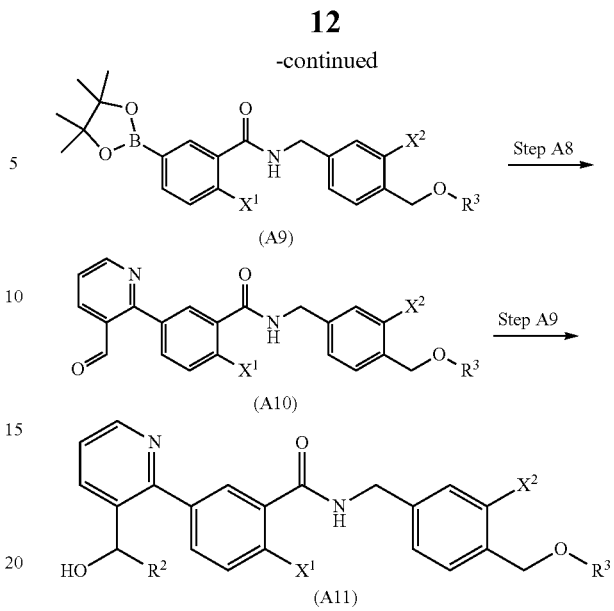

wherein $R^2$, $R^3$, $X^1$, and $X^2$ are as described above, and $X^A$ and $X^B$ are each independently a halogen.

In step A1, compound (A1) is esterified with iodomethane to obtain compound (A2).

In step A2, compound (A2) is reacted with a reducing agent (e.g., sodium borohydride) to obtain compound (A3).

In step A3, compound (A3) is reacted with a strong base (e.g., sodium hydride), and then reacted with a halide that provides $R^3$ (e.g., iodomethane) to obtain compound (A4).

In step A4, compound (A4) is cyanated by using a cyanating agent (e.g., zinc cyanide) to obtain compound (A5).

In step A5, compound (A5) is reacted with a reducing agent (e.g., borane-dimethyl sulfide complex) to obtain compound (A6).

In step A6, compound (A6) is reacted with compound (A7) to obtain compound (A8).

In step A7, compound (A8) is reacted with bis(pinacolato)diboron to obtain compound (A9).

In step A8, compound (A9) is reacted with 2-halogenated pyridine 3-carbaldehyde to obtain compound (A10).

In step A9, compound (A10) is reacted with a reducing agent (e.g., sodium borohydride) or reacted with a Grignard reagent that provides $R^2$ to obtain compound (A11).

The synthesis method for the compound or the pharmaceutically acceptable salt of the compound as described above can be, in another example, scheme B in the following:

<Scheme B>

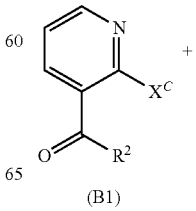

(B1)

-continued

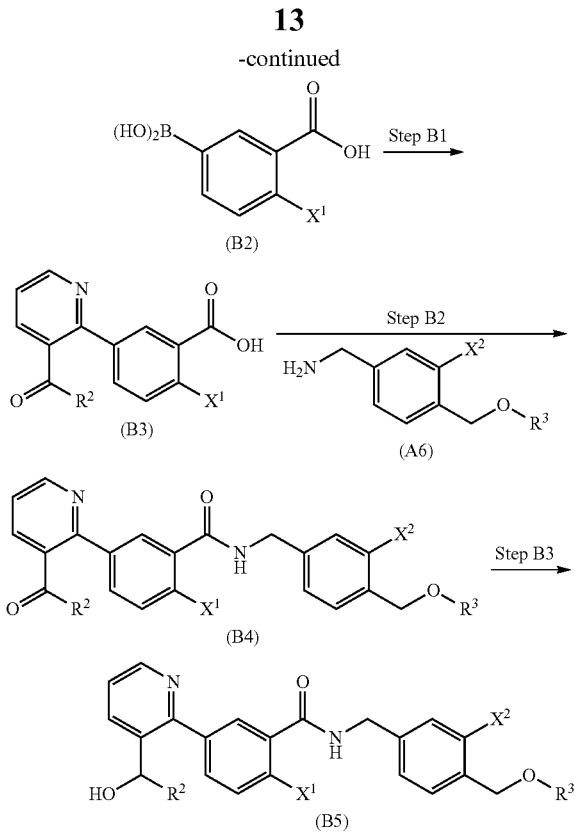

wherein $R^2$, $R^3$, $X^1$, and $X^2$ are as described above, and $X^C$ is a halogen.

In step B1, compound (Bi) is reacted with compound (B2) to obtain compound (B3).

In step B2, compound (B3) is reacted with compound (A6) to obtain compound (B4).

In step B3, compound (B4) is reacted with a reducing agent (e.g., sodium borohydride) to obtain compound (B5).

The synthesis method for the compound or the pharmaceutically acceptable salt of the compound as described above can be, in another example, scheme C in the following:

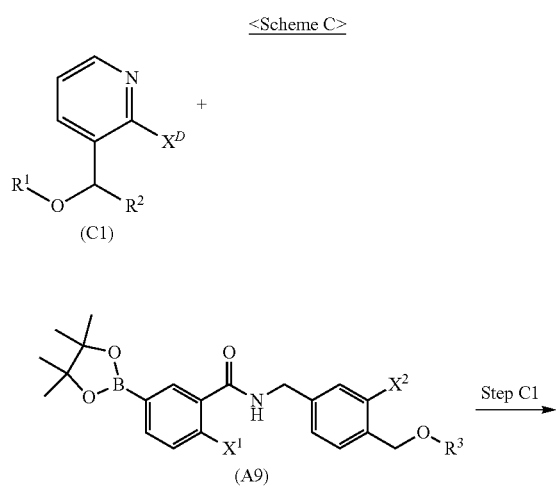

-continued

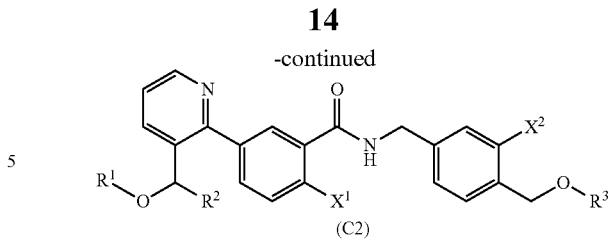

wherein $R^1$ to $R^3$, $X^1$, and $X^2$ are as described above, and $X^D$ is a halogen.

In step C1, compound (C1) is reacted with compound (A9) to obtain compound (C2).

The synthesis method for the compound or the pharmaceutically acceptable salt of the compound as described above is not limited to schemes A to C above, and those skilled in the art can appropriately set a suitable synthesis route and reaction conditions according to the structure of the final compound. In the case that the final compound has a heterocycle being not a pyridine ring (e.g., a pyrazole ring), for example, a compound having the corresponding heterocycle can be suitably used in place of compound (C1) in scheme C.

The prodrug of the compound or the pharmaceutically acceptable salt of the compound as described above can be suitably synthesized, for example, by introducing a phosphate group with a known method.

If stereoisomers are present for the compound represented by the formula (1), the pharmaceutically acceptable salt of the compound, or the prodrug of the compound or the salt, the isomers can be resolved with a known method. Examples of such known methods can include chromatography methods, enzymatic methods, and crystallization methods.

EXAMPLES

Hereinafter, the present invention will be described in more detail with reference to Examples and Comparative Examples; however, the technical scope of the present invention is not limited thereto.

Production Example 1-1

Methyl 4-bromo-2-fluorobenzoate

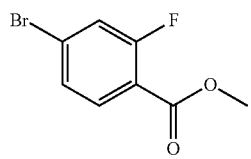

To a mixture of 4-bromo-2-fluorobenzoic acid (30 g, 0.14 mol), potassium carbonate (38 g, 0.27 mol), and N,N-dimethylformamide (DMF) (300 mL), iodomethane (16 mL, 0.27 mol) was added at room temperature, and the resultant was stirred at the same temperature for 16 hours. Water (200 mL) was added to the reaction mixture, which was subjected to extraction with ethyl acetate (300 mL). The organic layer was dried over sodium sulfate, and the solvent was distilled off under reduced pressure to afford the title compound (30 g).

$^1$H-NMR Spectrum (CDCl$_3$) δ (ppm): 3.94 (3H, s), 7.81 (1H, s, J=16 Hz), 7.32 (2H, m)

Production Example 1-2

(4-Bromo-2-fluorophenyl)methanol

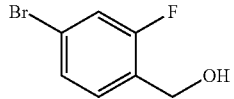

To a mixture of methyl 4-bromo-2-fluorobenzoate (30 g, 0.13 mol) obtained in Production Example 1-1 and methanol (300 mL), sodium borohydride (0.38 g, 10 mmol) was added at 0° C. over a period of 30 minutes, and the resultant was stirred at 60° C. for 16 hours. Water (20 mL) was added to the reaction mixture, and methanol in the reaction mixture was distilled off under reduced pressure. Water (250 mL) was added to the reaction mixture, which was subjected to extraction with dichloromethane (200 mL, twice). The two organic layers were combined, the combined organic layer was dried over sodium sulfate, and the solvent was distilled off under reduced pressure to afford the title compound (25 g). $^1$H-NMR Spectrum (CDCl$_3$) δ (ppm): 4.72 (2H, s), 7.25 (1H, m), 7.34 (2H, m).

Production Example 1-3

4-Bromo-2-fluoro-1-(methoxymethyl)benzene

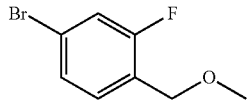

To a mixture of 60% sodium hydride (7.3 g, 0.18 mol) and DMF (150 mL), a mixture of (4-bromo-2-fluorophenyl) methanol (25 g, 0.12 mol) obtained in Production Example 1-2 and DMF (50 mL) were added at 0° C. over a period of 20 minutes. Iodomethane (15 mL, 0.24 mol) was added to the reaction mixture at room temperature, and the resultant was stirred at the same temperature for 16 hours. The reaction mixture was cooled to 0° C., ice-cooled water (500 mL) was added thereto, and the reaction mixture was subjected to extraction with ethyl acetate (250 mL, then 150 mL). The two organic layers were combined, the combined organic layer was dried over sodium sulfate, and the solvent was distilled off under reduced pressure to afford the title compound (20 g).
$^1$H-NMR Spectrum (CDCl$_3$) δ (ppm): 3.40 (3H, s), 4.47 (2H, s), 7.23 (1H, m), 7.28 (2H, m).

Production Example 1-4

3-Fluoro-4-(methoxymethyl) benzonitrile

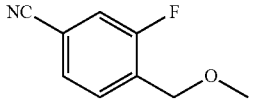

A mixture of 4-bromo-2-fluoro-1-(methoxymethyl)benzene (20 g, 91 mmol) obtained in Production Example 1-3, zinc dust (0.29 g, 4.6 mmol), zinc cyanide (16 g, 0.14 mol), and DMF (250 mL) was degassed and purged with argon gas. Tris(dibenzylideneacetone)dipalladium(0) (4.2 g, 4.6 mmol) and 1,1'-bis (diphenylphosphino) ferrocene (5.1 g, 9.1 mmol) were added to the reaction mixture at the same temperature, which was again degassed and purged with argon gas. The reaction mixture was stirred at 100° C. for 16 hours. Water (500 mL) was added to the reaction mixture, which was subjected to extraction with ethyl acetate (500 mL, then 200 mL). The two organic layers were combined, the combined organic layer was dried over sodium sulfate, and the solvent was distilled off under reduced pressure. The residue was purified by silica gel column chromatography (15 to 20% ethyl acetate-n-hexane solution) to afford the title compound (10 g).
$^1$H-NMR Spectrum (CDCl$_3$) δ (ppm): 3.45 (3H, s), 4.56 (2H, s), 7.35 (1H, d, J=9.2 Hz), 7.48 (1H, d, J=8 Hz), 7.58 (1H, t, J=14 Hz).

Production Example 1-5

(3-Fluoro-4-(methoxymethyl)phenyl)methanamine hydrochloride

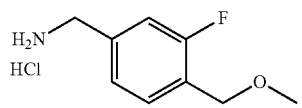

To a mixture of 3-fluoro-4-(methoxymethyl)benzonitrile (10 g, 61 mmol) obtained in Production Example 1-4 and tetrahydrofuran (THF) (100 mL), borane-dimethyl sulfide complex (18 mL, 0.24 mol) was added dropwise at 0° C. over a period of 20 minutes, and the resultant was stirred at 80° C. for 16 hours. The reaction mixture was cooled to 0° C., methanol (25 to 30 mL) was added thereto at the same temperature, and the solvent was distilled off under reduced pressure. Dichloromethane (100 mL) was added to the residue, to which 4 M hydrochloric acid-1,4-dioxane solution in an adequate amount for salt formation was added, and the resultant was stirred at room temperature for 30 minutes. The solvent was distilled off under reduced pressure, and the residue was washed with diethyl ether to afford the title compound (5.0 g).
$^1$H-NMR Spectrum (DMSO-d$_6$) δ (ppm): 3.37 (3H, s), 4.00 (2H, s), 4.54 (2H, s), 7.31 (1H, d, J=7.6 Hz), 7.39 (1H, d, J=11 Hz), 7.46 (1H, t, J=7.6 Hz), 8.19 (3H, s).

Production Example 1-6

5-Bromo-2-fluoro-N-(3-fluoro-4-(methoxymethyl) benzyl)benzamide

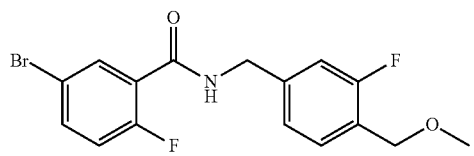 [SMILES: COCc1ccc(CNC(=O)c2cc(Br)ccc2F)cc1F]

To a mixture of 5-bromo-2-fluorobenzoic acid (5.0 g, 23 mmol), (3-fluoro-4-(methoxymethyl)phenyl)methanamine hydrochloride (5.6 g, 27 mmol) obtained in Production Example 1-5, and DMF (50 mL), diisopropylethylamine (13 mL, 46 mmol) and propanephosphonic acid anhydride (15 mL, 46 mmol) were sequentially added at 0° C. The reaction mixture was stirred at room temperature for 3 hours. Water (200 mL) was added to the reaction mixture, which was stirred for 30 minutes. A solid generated was collected through filtration, and washed with water (100 mL, twice). The solid was dried under reduced pressure to afford the title compound (5.2 g).

$^1$H-NMR Spectrum (DMSO-$d_6$) δ (ppm): 3.28 (3H, s), 4.46 (4H, m), 7.16 (2H, m), 7.40 (2H, m), 7.78 (2H, m), 9.03 (1H, m)

Production Example 1-7

2-Fluoro-N-(3-fluoro-4-(methoxymethyl)benzyl)-5-(4,4,5,5-tetramethyl-1,3,2-dioxabororan-2-yl)benzamide

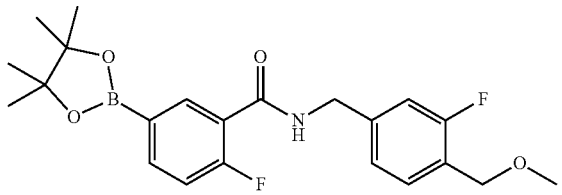

A mixture of 5-bromo-2-fluoro-N-(3-fluoro-4-(methoxymethyl)benzyl)benzamide (4.0 g, 19 mmol) obtained in Production Example 1-6, bis(pinacolato)diboron (6.8 g, 10 mmol), potassium acetate (3.5 g, 9.1 mmol), and DMF (50 mL) was degassed and purged with argon gas. Dichloro(1,1'-bis(diphenylphosphino)ferrocene)palladium (0.16 g, 0.23 mmol) was added to the reaction mixture at the same temperature, which was again degassed and purged with argon gas. The reaction mixture was stirred at 100° C. for 16 hours. Water (100 mL) was added to the reaction mixture, which was subjected to extraction with ethyl acetate (100 mL, twice). The two organic layers were combined, the combined organic layer was dried over sodium sulfate, and the solvent was distilled off under reduced pressure. The residue was purified by silica gel column chromatography (15 to 20% ethyl acetate-n-hexane solution) to afford the title compound (4 g) as a crude form. This was used for the subsequent reaction without further purification.

Production Example 1-8

2-Fluoro-N-(3-fluoro-4-(methoxymethyl)benzyl)-5-(3-formylpyridin-2-yl)benzamide

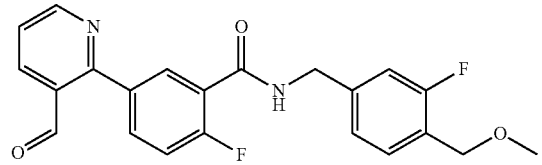 [SMILES: COCc1ccc(CNC(=O)c2cc(-c3ncccc3C=O)ccc2F)cc1F]

A mixture of 2-fluoro-N-(3-fluoro-4-(methoxymethyl)benzyl)-5-(4,4,5,5-tetramethyl-1,3,2-dioxabororan-2-yl)benzamide (2.0 g) obtained in Production Example 1-7, 2-bromopyridine 3-carbaldehyde (0.98 g, 4.7 mmol), potassium carbonate (1.3 g, 9.5 mmol), 1,4-dioxane (20 mL), and water (2 mL) was degassed and purged with nitrogen gas. Dichloro(1,1'-bis(diphenylphosphino)ferrocene)palladium (0.39 g, 0.25 mmol) was added to the reaction mixture at the same temperature, which was stirred under a nitrogen atmosphere at 110° C. for 16 hours. The temperature of the reaction mixture was returned to room temperature, ethyl acetate (50 mL) was added thereto, and the reaction mixture was filtered through a Celite. The Celite was washed with ethyl acetate (20 mL). The solvent of the filtrate was distilled off under reduced pressure, and the residue was purified by silica gel column chromatography (15 to 20% ethyl acetate-n-hexane solution) to afford the title compound (1.1 g).

$^1$H-NMR Spectrum (DMSO-$d_G$) δ (ppm): 3.28 (3H, s), 4.42 (2H, s), 4.50 (2H, s), 7.18 (2H, m), 7.40 (1H, t, J=15.4 Hz), 7.51 (1H, t, J=18 Hz), 7.66 (1H, m), 7.83 (1H, m), 7.91 (1H, m), 8.30 (1H, d, J=7.5 Hz), 8.92 (1H, m), 9.06 (1H, bs), 9.98 (1H, s).

Example 1

2-Fluoro-N-(3-fluoro-4-(methoxymethyl)benzyl)-5-(3-(hydroxymethyl)pyridin-2-yl)benzamide

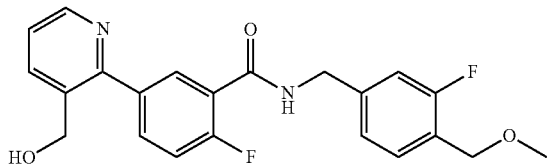 [SMILES: COCc1ccc(CNC(=O)c2cc(-c3ncccc3CO)ccc2F)cc1F]

To a mixture of 2-fluoro-N-(3-fluoro-4-(methoxymethyl)benzyl)-5-(3-formylpyridin-2-yl)benzamide (1.0 g, 2.5 mmol) obtained in Production Example 1-8 and methanol (10 mL), sodium borohydride (0.38 g, 10 mmol) was slowly added at 0° C., and the resultant was stirred at room temperature for 16 hours. Water was added to the reaction mixture, which was subjected to extraction with dichloromethane (25 mL, then 15 mL). The two organic layers were combined, the combined organic layer was dried over sodium sulfate, and the solvent was distilled off under reduced pressure to afford the title compound (0.90 g).

ESI-MS: m/z 399.50 [M+1]$^+$

Example 2

Racemic 2-fluoro-N-(3-fluoro-4-(methoxymethyl)benzyl)-5-(3-(1-hydroxyethyl)pyridin-2-yl)benzamide

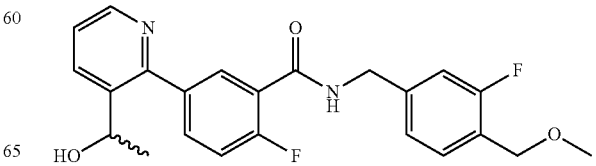

To a mixture of 2-fluoro-N-(3-fluoro-4-(methoxymethyl) benzyl)-5-(3-formylpyridin-2-yl)benzamide (1.3 g, 3.7 mmol) described in Production Example 1-8 and THF (15 mL), methylmagnesium bromide (3 M in diethyl ether, 2.7 mL, 9.2 mmol) was added dropwise at 0° C., and the resultant was stirred at room temperature for 1 hour. The reaction mixture was cooled to 0° C., and saturated aqueous solution of ammonium chloride (5 mL) was added thereto at the same temperature. The reaction mixture was subjected to extraction with ethyl acetate (25 mL, then 15 mL). The two organic layers were combined, the combined organic layer was dried over sodium sulfate, and the solvent was distilled off under reduced pressure. The residue was purified by silica gel column chromatography (70% ethyl acetate-n-hexane solution) to afford the title compound (0.23 g).

$^1$H-NMR Spectrum (DMSO-d$_6$) δ (ppm): 1.23 (3H, d, J=6.4 Hz), 3.28 (3H, s), 4.42 (2H, s), 4.48 (2H, d, J=6 Hz), 4.77-4.81 (1H, m), 5.30 (1H, d, J=4 Hz), 7.13-7.18 (2H, m), 7.36-7.46 (3H, m), 7.64-7.67 (1H, m), 7.72-7.75 (1H, m), 8.03-8.04 (1H, d, J=6.4 Hz), 8.52-8.54 (1H, m), 9.03 (1H, t, J=6 Hz).

Examples 3 and 4

Chiral 2-fluoro-N-(3-fluoro-4-(methoxymethyl)benzyl)-5-(3-(1-hydroxyethyl)pyridin-2-yl)benzamide

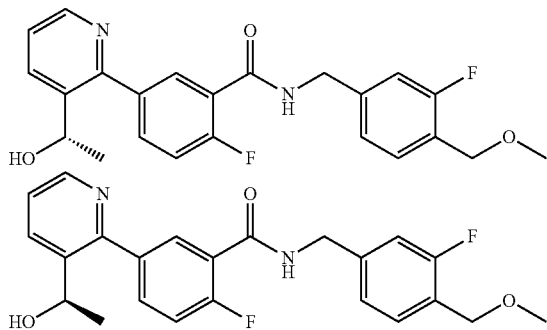

The enantiomers of racemic 2-fluoro-N-(3-fluoro-4-(methoxymethyl)benzyl)-5-(3-(1-hydroxyethyl) pyridin-2-yl)benzamide (0.80 g) obtained in Example 2 were separated by using supercritical fluid chromatography (SFC) (Chiralpak-IG, 20% methanol-carbon dioxide containing 0.2% triethylamine). An enantiomer eluted earlier (0.26 g, Example 3) and an enantiomer eluted later (0.32 g, Example 4.) were obtained.

Production Example 5-1

4-((Difluoromethoxy)methyl)-3-fluorobenzonitrile

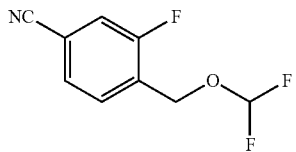 [SMILES: N#Cc1ccc(COC(F)F)c(F)c1]

To a mixture of 4-(hydroxymethyl)-3-fluorobenzonitrile (1.0 g, 6.6 mmol) and dichloromethane (5 mL), 2 N aqueous solution of sodium hydroxide (0.53 g, 13 mmol) and (bromodifluoromethyl)trimethylsilane (1.6 mL, 9.9 mmol) were sequentially added at room temperature, and the resultant was stirred at the same temperature for 48 hours. Water was added to the reaction mixture, which was subjected to extraction with dichloromethane (50 mL, twice). The organic layers were combined, and the combined organic layer was washed with brine and then dried over sodium sulfate. The solvent was distilled off under reduced pressure. The residue was purified by silica gel column chromatography (2% ethyl acetate-n-hexane solution) to afford the title compound (0.25 g).

$^1$H-NMR Spectrum (DMSO-d$_6$) δ (ppm): 5.05 (2H, s), 6.82 (1H, t, J=75 Hz), 7.69-7.76 (2H, m), 7.91 (1H, d, J=9.2 Hz).

Production Example 5-2

(4-((Difluoromethoxy)methyl)-3-fluorophenyl)methanamine

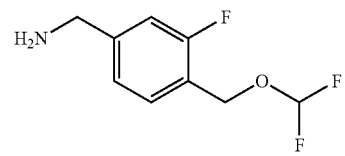 [SMILES: NCc1ccc(COC(F)F)c(F)c1]

To a mixture of 4-((difluoromethoxy)methyl)-3-fluorobenzonitrile (0.30 g, 1.5 mmol) obtained in Production Example 5-1 and methanol (5 mL), nickel(II) chloride hexahydrate (39 mg, 0.30 mmol) and sodium borohydride (0.17 g, 4.5 mmol) were slowly added at 0° C., and the resultant was stirred at the same temperature for 1 hour. Iced water was added to the reaction mixture, which was subjected to extraction with dichloromethane (25 mL, twice). The two organic layers were combined, and the combined organic layer was washed with brine and then dried over sodium sulfate. The solvent was distilled off under reduced pressure. The residue was purified by silica gel column chromatography (8% methanol-dichloromethane solution) to afford the title compound (200 mg).

$^1$H-NMR Spectrum (DMSO-d$_6$) δ (ppm): 3.72 (2H, s), 4.91 (2H, s), 6.77 (1H, t, J=75 Hz), 7.15-7.23 (2H, m), 7.37-7.41 (1H, m).

Production Example 5-3

5-(3-Acetylpyridin-2-yl)-2-fluorobenzoic acid

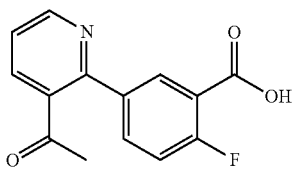 [SMILES: CC(=O)c1cccnc1-c1ccc(F)c(C(=O)O)c1]

To a mixture of 3-carboxy-4-fluorophenylboronic acid (3.0 g, 16 mmol), 3-acetyl-2-bromopyridine (3.3 g, 16 mmol), 1,4-dioxane (30 mL), and water (10 mL), potassium carbonate (4.5 g, 33 mmol) was added at room temperature, and the resultant was degassed and purged with nitrogen gas.

Dichloro(1,1'-bis (diphenylphosphino) ferrocene)palladium dichloromethane complex (0.67 g, 0.82 mmol) was added to the reaction mixture at the same temperature, which was stirred at 100° C. for 16 hours. The temperature of the reaction mixture was returned to room temperature, and the solvent was distilled off under reduced pressure. Dichloromethane (75 mL) was added to the residue, the resultant was filtered, and the residue was washed with dichloromethane (75 mL). The solvent of the filtrate was distilled off under reduced pressure, and the residue was purified by silica gel column chromatography (10% to 12% methanol-dichloromethane solution) to afford the title compound (2.1 g).

$^1$H-NMR Spectrum (DMSO-d$_6$) δ (ppm): 2.37 (3H, s), 7.28-7.31 (1H, m), 7.37-7.42 (1H, m), 7.70-7.72 (1H, m), 7.98-8.00 (1H, m), 8.10-8.12 (1H, m), 8.76-8.77 (1H, m), 13.34 (1H, bs).

Production Example 5-4

5-(3-Acetylpyridin-2-yl)-N-(4-((difluoromethoxy)methyl)-3-fluorobenzyl)-2-fluorobenzamide

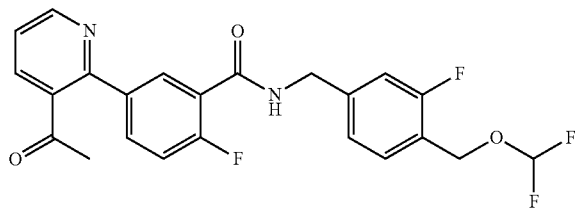 [SMILES: CC(=O)c1cccnc1-c1ccc(F)c(C(=O)NCc2ccc(COC(F)F)c(F)c2)c1]

To a mixture of 5-(3-acetylpyridin-2-yl)-2-fluorobenzoic acid (0.10 g, 0.39 mmol) obtained in Production Example 5-3 and DMF (3 mL), diisopropylethylamine (0.21 mL, 1.2 mmol) and propanephosphonic acid anhydride (50% ethyl acetate solution) (0.24 mL, 0.78 mmol) were sequentially added under a nitrogen atmosphere at 0° C., and the resultant was stirred at the same temperature for 15 minutes. To the reaction mixture, (4-((difluoromethoxy)methyl)-3-fluorophenyl)methanamine (79 mg, 0.39 mmol) obtained in Production Example 5-2 was added at the same temperature, and the resultant was stirred at room temperature for 16 hours. Water was added to the reaction mixture, which was subjected to extraction with ethyl acetate (20 mL, twice). The two organic layers were combined, and the combined organic layer was washed with brine and then dried over sodium sulfate. The solvent was distilled off under reduced pressure, and the residue was purified by silica gel column chromatography (55% ethyl acetate-n-hexane solution) to afford the title compound (60 mg). $^1$H-NMR Spectrum (DMSO-d$_6$) δ (ppm): 2.38 (3H, s), 4.02 (2H, d, J=5.6 Hz), 4.93 (2H, s), 6.71 (1H, t, J=74 Hz), 7.18-7.21 (1H, m), 7.44-7.79 (4H, m), 7.78-7.79 (1H, m), 8.11 (1H, d, J=7.6 Hz), 8.76-8.77 (1H, m), 9.05-9.06 (1H, mi).

Example 5

N-(4-((Difluoromethoxy)methyl)-3-fluorobenzyl)-2-fluoro-5-(3-(1-hydroxyethyl)pyridin-2-yl)benzamide

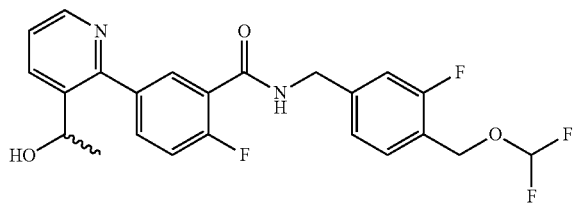 [SMILES: CC(O)c1cccnc1-c1ccc(F)c(C(=O)NCc2ccc(COC(F)F)c(F)c2)c1]

To a mixture of 5-(3-acetylpyridin-2-yl)-N-(4-((difluoromethoxy)methyl)-3-fluorobenzyl)-2-fluorobenzamide (0.15 g, 0.34 mmol) obtained in Production Example 5-4 and methanol (3 ML), sodium borohydride (26 mg, 0.69 mmol) was slowly added at 0° C., and the resultant was stirred at room temperature for 6 hours. Water was added to the reaction mixture, which was subjected to extraction with ethyl acetate (30 mL, twice). The two organic layers were combined, and the combined organic layer was washed with brine and then dried over sodium sulfate. The solvent was distilled off under reduced pressure. The residue was purified by silica gel column chromatography (55% ethyl acetate-n-hexane solution) to afford the title compound (30 mg).

$^1$H-NMR Spectrum (DMSO-d$_6$) δ (ppm): 1.27 (3H, d, J=6.4 Hz), 4.49 (2H, d, J=5.6 Hz), 4.77-4.81 (1H, m), 4.93 (2H, s), 5.30 (1H, J=4 Hz), 6.78 (1H, t, J=75 Hz), 7.18-7.21 (2H, m), 7.39-7.47 (3H, m), 7.64-7.68 (1H, m), 7.73-7.75 (1H, m), 8.03 (1H, d, J=8 Hz), 8.53 (1H, d, J=4.8 Hz), 9.05 (1H, t, J=5.6 Hz).

Production Example 6-1

2-Bromo-3-(methoxymethyl) pyridine

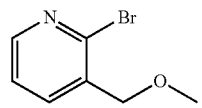

To a mixture of 60% sodium hydride (0.057 g, 2.4 mmol) and THF (3 mL), a mixture of (2-bromopyridin-3-yl)methanol (0.30 g, 1.6 mmol) and THF (3 mL) was added at 0° C. Iodomethane (0.15 mL, 2.4 mmol) was added to the reaction mixture at room temperature, which was stirred at the same temperature for 16 hours. The reaction mixture was cooled to 0° C., ice-cooled water was added thereto, and the reaction solution was subjected to extraction with ethyl acetate (15 mL, then 5 mL). The two organic layers were combined, the combined organic layer was dried over sodium sulfate, and the solvent was distilled off under reduced pressure to afford the title compound (0.15 g) as a crude form. This was used for the subsequent reaction without further purification.

Example 6

2-Fluoro-N-(3-fluoro-4-(methoxymethyl)benzyl)-5-(3-(methoxymethyl) pyridin-2-yl)benzamide

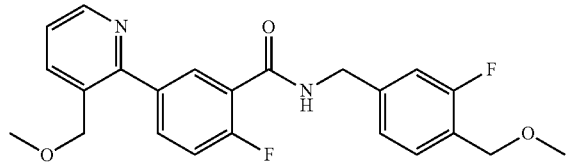

A mixture of 2-bromo-3-(methoxymethyl)pyridine (49 mg) obtained in Production Example 6-1, 2-fluoro-N-(3-fluoro-4-(methoxymethyl)benzyl)-5-(4,4,5,5-tetramethyl-1,3,2-dioxabororan-2-yl)benzamide (0.10 g) obtained in Production Example 1-7, sodium carbonate (0.050 g, 0.47 mmol), 1,4-dioxane (3 mL), and water (0.5 mL) was degassed and purged with argon gas. Dichloro(1,1'-bis(diphenylphosphino)ferrocene)palladium dichloromethane complex (8.0 mg, 0.0098 mmol) was added to the reaction mixture at the same temperature, which was again degassed and purged with argon gas, and the reaction mixture was stirred at 80° C. for 16 hours. The temperature of the reaction mixture was returned to room temperature, water (5 mL) was added thereto, and the reaction mixture was subjected to extraction with ethyl acetate (10 mL, then 5 mL). The two organic layers were combined, the combined organic layer was dried over sodium sulfate, and the solvent was distilled off under reduced pressure. The residue was purified by silica gel column chromatography (20% ethyl acetate-n-hexane solution) to afford the title compound (0.080 g).

$^1$H-NMR Spectrum (DMSO-$d_6$) δ (ppm): 3.28 (3H, s), 3.29 (3H, s), 4.36 (2H, s), 4.42 (2H, s), 4.48 (2H, d, J=6 Hz), 7.13-7.18 (2H, m), 7.36-7.45 (3H, m), 7.75-7.79 (1H, m), 7.87-7.89 (1H, m), 7.91-7.93 (1H, m), 8.61-8.63 (1H, m), 9.01 (1H, t, J=11 Hz).

Production Example 7-1

(5-Iodo-1H-pyrazol-4-yl)methanol

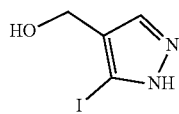

To a mixture of ethyl 5-iodo-1H-pyrazole-4-carboxylate (4.0 g, 15 mmol) and THF (4 mL), borane-THF solution (1 M THF solution, 30 mL) was added dropwise at 0° C. The reaction mixture was stirred at room temperature for 1 hour. Methanol (20 mL) was added dropwise to the reaction mixture at the same temperature, which was stirred for 30 minutes. The solvent of the reaction mixture was distilled off under reduced pressure. The residue was purified by high-performance liquid chromatography to afford the title compound (1.5 g).

ESI-MS: m/z 224.9 [M+1]$^+$

Production Example 7-2

(3-Fluoro-4-(methoxymethyl) phenyl)methanamine

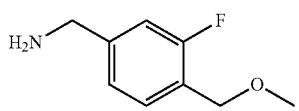

To a mixture of 3-fluoro-4-(methoxymethyl)benzonitrile (8.0 g, 48 mmol) described in Production Example 1-4 and methanol (50 mL), Raney nickel (20 g) was added, and the resultant was stirred under a hydrogen atmosphere at room temperature overnight. The reaction mixture was degassed and purged with nitrogen, and filtered through a Celite. The solvent of the filtrate was distilled off under reduced pressure to afford the title compound (7.5 g) as a crude form. The crude form was used as it is for the subsequent reaction.

Production Example 7-3

5-Bromo-2-chloro-N-(3-fluoro-4-(methoxymethyl) benzyl)benzamide

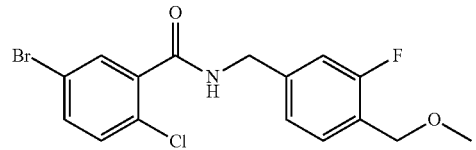

A mixture of 5-bromo-2-chlorobenzoic acid (1.9 g, 8.1 mmol) and thionyl chloride (15 mL) was heated to reflux for 1.5 hours. The temperature of the reaction mixture was returned to room temperature, and the solvent was distilled off under reduced pressure. To a mixture of the residue and dichloromethane (30 mL), a mixture of (3-fluoro-4-(methoxymethyl)phenyl)methanamine (1.4 g) as a crude form obtained in Production Example 7-2, triethylamine (1.2 g, 12 mmol), and dichloromethane (15 mL) was added dropwise at 0° C. The reaction mixture was stirred at room temperature overnight. Water was added to the reaction mixture at room temperature, which was subjected to extraction with dichloromethane (50 mL, three times). The organic layers were washed with brine and then dried over sodium sulfate, and the solvent was distilled off under reduced pressure. The residue was purified by silica gel column chromatography (petroleum ether/ethyl acetate=2/1) to afford the title compound (1.1 g).

ESI-MS: m/z 386.0 [M+1]$^+$

Production Example 7-4

2-Chloro-N-(3-fluoro-4-(methoxymethyl)benzyl)-5-(4,4,5,5-tetramethyl-1,3,2-dioxabororan-2-yl)benzamide

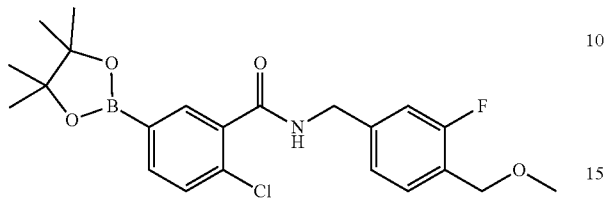

To a mixture of 5-bromo-2-chloro-N-(3-fluoro-4-(methoxymethyl)benzyl)benzamide (1.1 g, 2.8 mmol) obtained in Production Example 7-3, bis(pinacolato)diboron (0.87 g, 3.4 mmol), and 1,4-dioxane (20 mL), potassium acetate (0.84 g, 8.5 mmol) and (1,1'-bis(diphenylphosphino)ferrocene)dichloropalladium (0.21 g, 0.28 mmol) were added at room temperature. The reaction mixture was stirred at 95° C. for 3 hours. The temperature of the reaction mixture was returned to room temperature, and water was added to the reaction mixture, which was subjected to extraction with ethyl acetate (50 mL, three times). The organic layers were washed with brine, and dried over, sodium sulfate. The solvent was distilled off under reduced pressure to afford the title compound (0.80 g).

ESI-MS: m/z 434.1 [M+1]$^+$

Example 7

2-Chloro-N-(3-fluoro-4-(methoxymethyl)benzyl)-5-(4-(hydroxymethyl)-1H-pyrazol-3-yl)benzamide

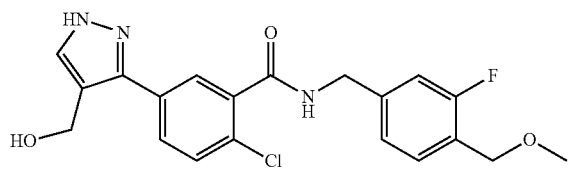 [SMILES: COCc1ccc(CNC(=O)c2cc(-c3n[nH]cc3CO)ccc2Cl)cc1F]

To a mixture of 2-chloro-N-(3-fluoro-4-(methoxymethyl)benzyl)-5-(4,4,5,5-tetramethyl-1,3,2-dioxabororan-2-yl)benzamide (0.40 g, 0.92 mmol) obtained in Production Example 7-4, (5-iodo-1H-pyrazol-4-yl)methanol (310 mg, 1.4 mmol) obtained in Production Example 7-1, n-propanol (9 mL), and water (6 mL), sodium carbonate (750 mg, 2.3 mmol) and [1,1'-bis(diphenylphosphino)ferrocene]dichloropalladium(II) (70 mg, 0.090 mmol) were added at room temperature, and the resultant was stirred at 95° C. overnight. The temperature of the reaction mixture was returned to room temperature, and the solvent was distilled off under reduced pressure. The residue was purified by high-performance liquid chromatography to afford the title compound (57 mg).

$^1$H-NMR Spectrum (CD3OD) δ (ppm): 3.40 (3H, s), 4.53 (2H, s), 4.61 (4H, d, J=9.0 Hz), 7.20 (1H, d, J=10.9 Hz), 7.26 (1H, d, J=7.9 Hz), 7.43 (1H, t, J=7.6 Hz), 7.58 (1H, s), 7.70-7.99 (3H, m).

Comparative Example 1

A compound below, which is a commercially available product, was used as Comparative Example 1. The following compound is a compound described in International Publication No. WO 2008/112164.

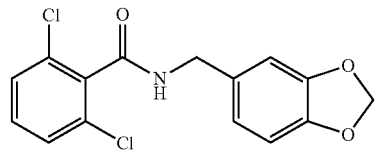 [SMILES: O=C(NCc1ccc2c(c1)OCO2)c1c(Cl)cccc1Cl]

Comparative Example 2

The following compound was synthesized in accordance with a method described in International Publication No. WO 2015/127137, and used as Comparative Example 2.

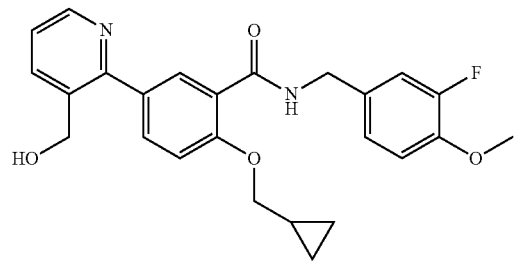 [SMILES: COc1ccc(CNC(=O)c2cc(-c3ncccc3CO)ccc2OCC2CC2)cc1F]

Comparative Example 3

The following compound was synthesized in accordance with a method described in International Publication No. WO 2019/151241, and used as Comparative Example 3.

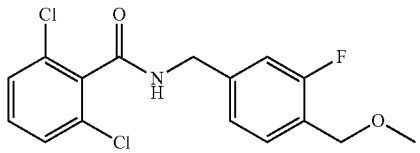

Comparative Example 4

The following compound was synthesized in accordance with a method described in International Publication No. WO 2019/151241, and used as Comparative Example 4.

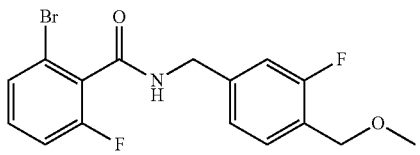 [SMILES: COCc1ccc(CNC(=O)c2c(F)cccc2Br)cc1F]

Comparative Example 5

The following compound was synthesized in accordance with a method described in International Publication No. WO 2019/151241, and used as Comparative Example 5.

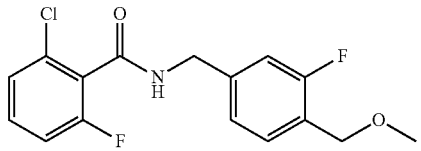 [SMILES: COCc1ccc(CNC(=O)c2c(F)cccc2Cl)cc1F]

Comparative Example 6

The following compound was synthesized in accordance with a method described in International Publication No. WO 2019/151241, and used as Comparative Example 6.

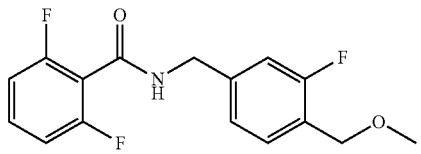 [SMILES: COCc1ccc(CNC(=O)c2c(F)cccc2F)cc1F]

Test Example 1: ALDH2 Activation Effect

The activation effect of each test compound on the acetaldehyde oxidation rate of ALDH2 was measured with the following method. A test was conducted by using a commercially available PicoProbe™ Aldehyde dehydrogenase Activity Assay Kit (manufactured by BioVision Inc.) with reference to an instruction attached to the product under the following conditions. To each well of a 384-well plate, the following (1) to (3) were sequentially added with a pipette:

(1) 10 μL of solution obtained by dissolving and diluting a human recombinant ALDH2 enzyme (manufactured by BioVision Inc.) with ALDH assay Buffer to reach 3-μg/mL;

(2) 10 μL of 30 μM or 90 μM test compound solution (with 3% DMSO) prepared by using ALDH assay Buffer; and (3) 10 μL of Reaction mix composed with ratio of 8.6 μL of ALDH assay Buffer, 0.6 μL of PicoProbe, 0.3 μL of Substrate Mix, and 1.5 μL of Acetaldehyde.

Before addition of (3), incubation was performed at room temperature for 5 minutes. After addition of (3), fluorescence intensity was measured at room temperature every 2.5 minutes over a period of 180 minutes by using an EnSight (manufactured by PerkinElmer Inc.). Wavelengths of 535 nm and 587 nm were used for fluorescence intensities of excitation and -emission, respectively.

Table 1 shows acetaldehyde oxidation rates with addition of different test compounds as the acetaldehyde oxidation rate with addition of no test compound was assumed as 100%. The results in Table 1 confirmed that the compounds of Examples 1 to 7 each have ALDH2 activation effect.

TABLE 1

| | Concentration of test compound | |
|---|---|---|
| | 10 μM | 30 μM |
| Example 1 | 196 | 238 |
| Example 2 | 127 | 166 |
| Example 3 | 137 | 176 |
| Example 4 | 131 | 155 |
| Example 5 | 124 | 146 |
| Example 6 | 139 | 161 |
| Example 7 | 157 | 170 |
| Comparative Example 1 | 149 | 176 |

Test Example 2: Metabolic Stability with Mouse Hepatic Microsomes

Metabolic stability in mouse hepatic microsomes was evaluated with the following method.

1. Materials
   (1) Mouse hepatic microsomes: 20 mg/mL
   (2) Test compound: 1.1 mM DMSO solution
   (3) Potassium phosphate buffer solution: 66.7 mM (pH 7.4)
   (4) NADPH solution: 10 mM in potassium phosphate buffer solution
   (5) Quenching solution: 0.5% formic acid-acetonitrile solution with warfarin as internal standard substance 2. Method Into a propylene tube, 971.5 μL of the potassium phosphate buffer solution and 27.5 μL of the mouse hepatic microsomes were put and suspended. Thereto, 1 μL of a test compound was added, and 180 μL was taken from this mixture and transferred into another tube. The mixture was preincubated at 37° C. for 5 minutes, and 20 μL of the NADPH solution (for the case with an incubation time of 30 minutes) or 20 μL of the potassium phosphate buffer solution (for the case with an incubation time of 0 minutes) was then added thereto. After incubation, 200 μL of the quenching solution was added to terminate the reaction. Subsequently, centrifugation was performed at 3220×g for 20 minutes, and the concentration of the unchanged form of the test compound in 200 μL of the supernatant was measured with LC-MS/MS. On the basis of the peak area obtained for the unchanged form, the residual rate (%) of the unchanged form was calculated as that for the case with an incubation time of 0 minutes was assumed as 100%.

3. Results

Table 2 shows residual rates (%) of unchanged forms after 30 minutes. It was confirmed that the compounds of Examples 1 to 7 are superior in metabolic stability in mouse hepatic microsomes to conventional ALDH2 activating agents.

TABLE 2

| | Residual rate (%) |
|---|---|
| Example 1 | 90 |
| Example 2 | 68 |
| Example 3 | 64 |
| Example 4 | 60 |
| Example 5 | 52 |
| Example 6 | 24 |
| Example 7 | 74 |
| Comparative Example 1 | <1 |
| Comparative | 6 |

TABLE 2-continued

| | Residual rate (%) |
|---|---|
| Example 2 | |
| Comparative Example 3 | 1 |
| Comparative Example 4 | <1 |
| Comparative Example 5 | <1 |
| Comparative Example 6 | 1 |

Test Example 3: Metabolic Stability with Human Hepatic Microsomes

For the compounds of Examples 1, 2, 5 and 6, which had been confirmed to have stability in the mouse hepatic microsome test, metabolic stability with human hepatic microsomes was measured. The specific method is as follows.

2. Method
   (1) Fifty microliter-portions were taken from 0.2 μmol/L test compound diluted with β-NADPH solution.
   (2) Fifty microliters of 0.2 mg protein/mL human hepatic microsome solution was added to each (except for a sample with a reaction time of 0 minutes).
   (3) Incubation was performed with shaking at 37° C. for 30 minutes (concentration in reaction sample: 0.1 μmol/L test compound, 0.1 mg protein/mL human hepatic microsome).
   (4) After incubation, 400 μL of methanol was added to terminate the reaction.
   (5) To the sample with a reaction time of 0 minutes, 50 μL of 0.2 mg protein/mL hepatic microsome solution was added.
   (6) Each of the samples from (4) and (5) was left to stand at −20° C. for 30 minutes or longer, and then centrifuged at 4° C. and 3,000 rpm for approximately 10 minutes.
   (7) The supernatant was subjected to measurement with LC/MS/MS, and, based on the peak area obtained for the unchanged form, the residual rate (%) of the unchanged form was calculated as that for the case with an incubation time of 0 minutes was assumed as 100%.

Table 3 shows residual rates (%) of unchanged forms after 30 minutes.

TABLE 3

| | Residual rate (%) |
|---|---|
| Example 1 | 90 |
| Example 2 | 87 |
| Example 5 | 72 |
| Example 6 | 75 |

Test Example 4: Reactive Metabolite

The risk of production of a reactive metabolite was examined for each test compound by measuring the production of a glutathione conjugate in the presence of human hepatic microsomes through LC-MS/MS. The specific method is as follows.

1. Method
   (1) To a polypropylene tube, 55 μL of 20 mg/mL human hepatic microsome, 395 μL of 66.7 mM potassium phosphate buffer solution (pH 7.4), and 550 μL of 10 mM aqueous solution of glutathione were added.
   (2) Added was 0.55 μL of 20 mM test compound or positive control (Clozapine, Raloxifene, Diclofenac).
   (3) A 180 μL-portion thereof was put in each of four tubes, with two of them labeled T0 and the other two labeled T60, and the tubes were preincubated at 37±1° C. for 5 minutes.
   (4) To the T60 tubes and the T0 tubes, 20 μL of 10 mM NADPH solution and 20 μL of potassium phosphate buffer solution were added, respectively.
   (5) After 60 minutes, 200 μL of 10% trichloroacetic acid-acetonitrile solution was added to each tube to terminate the reaction.
   (6) Centrifugation was performed by using a centrifuge (5810-R, Eppendorf) at 3220×g for 20 minutes, and 200 μL of each supernatant was subjected to measurement of the GSH conjugate by LC-MS/MS (LC: SIL-HTc, Shimazu Corporation, Mass: API-4000 Qtrap, MDS Sciex).
   (7) The ratio (%), area for GSH conjugate found for test compound/area for GSH conjugate found for clozapine, was calculated.

2. Results

Table 4 shows the results. These results confirmed that the compounds of Examples cause less generation of the reactive metabolite than clozapine causes.

TABLE 4

| | Generation of reactive metabolite (% to clozapine) |
|---|---|
| Example 1 | 1 |
| Example 2 | <1 |
| Example 5 | 2 |
| Example 6 | 3 |
| Example 7 | <1 |

Test Example 5: hERG Channel Inhibition Effect

The hERG (human Ether-a-go-go Related Gene) channel inhibition effect of each test compound was examined with the following patch clamp method.

1. Method

Under a fixed potential, an hERG current that passed through the whole cell membrane was recorded with the whole-cell patch clamp method.

To confirm the hERG current, the holding potential was set to −80 mV, and depolarizing pulses at −50 mV for 110 msec and at 20 mV for 4 sec and a subsequent repolarizing pulse at −50 mV for 2 sec were provided at a frequency of once per 15 seconds. After the stabilization of the hERG tail current obtained was confirmed, an application was initiated. The pulses were continuously provided also during the application.

The sampling frequency was set to 5 kHz, and Lowpass Filter was applied at 2 kHz.

The temperature of the extracellular solution in the chamber during measurement was set to 22 to 25° C.

<Composition of Extracellular Solution>

NaCl: 137 mmol/L, KCl: 4 mmol/L, $CaCl_2$: 1.8 mmol/L, $MgCl_2$: 1 mmol/L, D(+)-glucose: 10 mmol/L, HEPES: 10 mmol/L (adjusted to pH 7.4 with 1 mol/L NaOH).

<Composition of Electrode Solution>

KCl: 130 mmol/L, MgCl$_2$: 1 mmol/L, EGTA: 5 mmol/L, MgATP: 5 mmol/L, HEPES: 10 mmol/L (adjusted to pH 7.2 with 1 mol/L KOH).

<Preparation of Glass Electrodes>

A glass capillary tube (G-1.5, NARISHIGE SCIENTIFIC INSTRUMENT LAB.) was processed by using a puller (P-97, Sutter Instrument Company), and glass electrodes with a resistance value in the range of 2 to 5 MΩ when being filled with the electrode solution were used for measurement.

<Measurement and Analysis> hERG currents were measured by using an amplifier for patch clamping (Axopatch 200B, Molecular Devices, LLC), and electric signals obtained were recorded in a computer via recording/analysis software for patch clamping (pCLAMP 10, Molecular Devices, LLC).

The maximum tail current value was determined on the basis of the current value with the depolarizing pulse at −50 mV for 110 msec, and the change rate (suppression rate) 5 minutes after the initiation of application to the maximum tail current value before application of the test compound was calculated.

2. Results

Table 5 shows the results. These results confirmed that the compounds of Examples exhibit no hERG channel inhibition effect.

TABLE 5

| hERG channel inhibition effect IC$_{50}$ value (μM) |  |
|---|---|
| Example 1 | >100 |
| Example 2 | >30 |

Test Example 6: Suppression Effect on Pain Induced by Carrageenan

This experiment was carried out with reference to Science Translational Medicine 6, 251ra118 (2014). Animals used were 7-week-old male C57BL/6J mice (Charles River Laboratories Japan, Inc.). To induce mechanical allodynia to a sole part, carrageenan was subcutaneously administered to the sole of the left hind limb of each mouse. The escape response against mechanical stimulation 180 minutes after the induction was measured by using a von Frey filament with bending force (0.16 grams) to the sole surface of the left hind limb in the ascending direction. The mouse was stimulated in the vertical direction for 6 seconds until the filament bent, and the escape response of the mouse was rated with three-grade scoring (0: no response or startle response (displacing the foot without ascending), 1: ascending the foot, 2: licking or shaking the foot). Stimulation was performed 10 times, and the total value of 10 scores (escape score) was calculated.

The compound (Example 1) was dissolved in DMSO/PEG400 (volume ratio: 1:1), and 2, 6, or 20 mg/kg (no compound for a Vehicle group) of the compound was subcutaneously administered to the back of the neck three times in total at the same dose: 15 minutes before injection of carrageenan, 30 minutes after injection of carrageenan, and 150 minutes after injection of carrageenan, each at a dose of 5 mL/kg in liquid volume. A 1.5% carrageenan solution was prepared with physiological saline, and subcutaneously administered to the sole of the left hind limb at 7 μL/body.

In significance test, the Steel's multiple comparison test was carried out for comparison among the Vehicle group and Example 1 groups, where the significance level was set to 5%. The commercially available statistical program SAS SYSTEM (SAS Software Release 9.1.3; SAS Institute Japan Ltd.) was used for the significance test.

As shown in Table 6, the compound of Example was demonstrated to suppress pain induced by carrageenan.

TABLE 6

| Group | Vehicle | Example 1 2 mg/kg | Example 1 6 mg/kg | Example 1 20 mg/kg |
|---|---|---|---|---|
| Number of animals | 8 | 8 | 8 | 8 |
| Pain-related total score Time after induction with carrageenan (min) | | | | |
| Pre | 2.8 ± 0.2 | 3.0 ± 0.3 | 3.0 ± 0.3 | 3.0 ± 0.3 |
| 180 | 13.0 ± 1.1 | 10.5 ± 1.6 | 8.3 ± 1.0* | 8.6 ± 1.4 |

Each value represents mean ± SE.
Pre: Before carrageenan treatment
*Significant difference from Vehicle group

What is claimed is:

1. A compound, a pharmaceutically acceptable salt of the compound, or a prodrug of the compound or the salt, the compound being represented by the following formula (1):

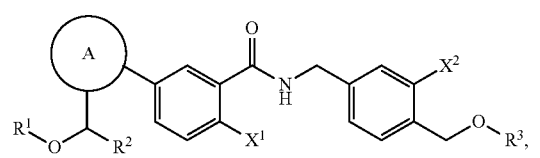

(1)

wherein
A is a heterocycle,
R$^1$ and R$^2$ are each independently hydrogen, an alkyl, an alkenyl, or an alkynyl,
R$^3$ is an alkyl, an alkenyl, or an alkynyl, and
X$^1$ and X$^2$ are each independently a halogen.

2. The compound, the pharmaceutically acceptable salt of the compound, or the prodrug of the compound or the salt according to claim 1, wherein A contains at least one nitrogen atom as a ring member atom.

3. The compound, the pharmaceutically acceptable salt of the compound, or the prodrug of the compound or the salt according to claim 1, wherein A is a five- or six-membered ring.

4. The compound, the pharmaceutically acceptable salt of the compound, or the prodrug of the compound or the salt according to claim 1, wherein A is an aromatic heterocycle.

5. The compound, the pharmaceutically acceptable salt of the compound, or the prodrug of the compound or the salt according to claim 1, wherein the compound represented by the formula (1) is a compound represented by the following formula (2) or (3):

Formula (2)

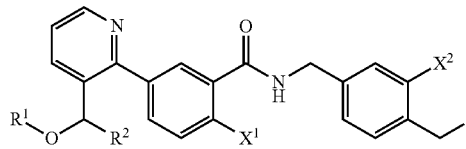

Formula (3)

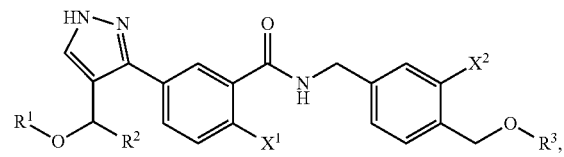

wherein R¹, R², R³, X¹, and X² are as described above.

6. The compound, the pharmaceutically acceptable salt of the compound, or the prodrug of the compound or the salt according to claim 1, wherein R¹ is hydrogen or an alkyl.

7. The compound, the pharmaceutically acceptable salt of the compound, or the prodrug of the compound or the salt according to claim 1, wherein R² is hydrogen or an alkyl.

8. The compound, the pharmaceutically acceptable salt of the compound, or the prodrug of the compound or the salt according to claim 1, wherein R³ is an alkyl substituted with a halogen, or an unsubstituted alkyl.

9. The compound, the pharmaceutically acceptable salt of the compound, or the prodrug of the compound or the salt according to claim 1, wherein X¹ is fluorine or chlorine.

10. The compound, the pharmaceutically acceptable salt of the compound, or the prodrug of the compound or the salt according to claim 1, wherein X² is fluorine.

11. The compound, the pharmaceutically acceptable salt of the compound, or the prodrug of the compound or the salt according to claim 1, wherein the compound represented by the formula (1) is selected from the group consisting of the following compounds:

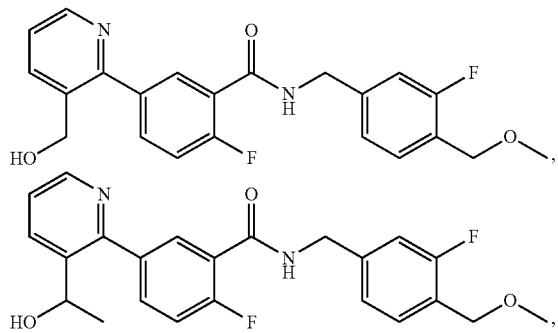

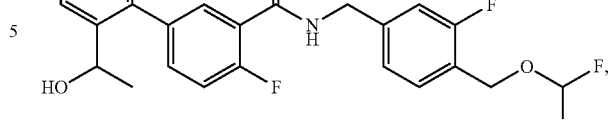

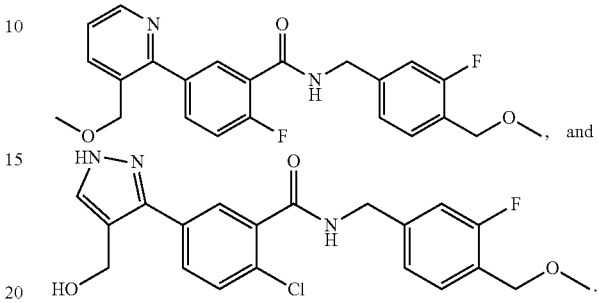

12. The prodrug according to claim 1 or a pharmaceutically acceptable salt of the prodrug, wherein R¹ is —CH₂—O—PO₃H₂.

13. The prodrug according to claim 1 or a pharmaceutically acceptable salt of the prodrug, wherein A contains at least one nitrogen atom as a ring member atom, and at least one of the nitrogen atoms is substituted with —CH₂—O—PO₃H₂.

14. The prodrug or the pharmaceutically acceptable salt of the prodrug according to claim 1, wherein the prodrug or the pharmaceutically acceptable salt of the prodrug is selected from the group consisting of the following compounds:

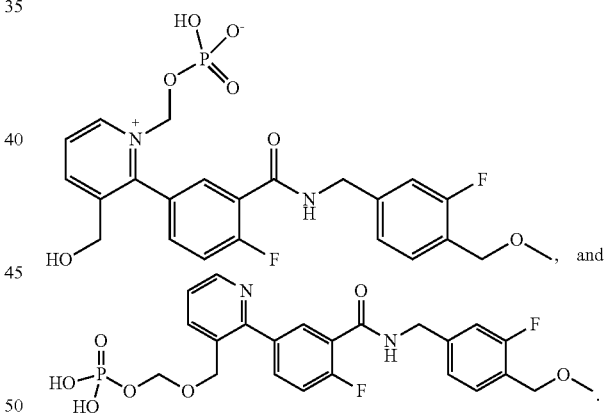

15. A method for activating aldehyde dehydrogenase 2, comprising administering an effective amount of the compound, the pharmaceutically acceptable salt of the compound, or the prodrug of the compound or the salt according to claim 1 to a patient in need thereof.

16. A pharmaceutical composition comprising the compound, the pharmaceutically acceptable salt of the compound, or the prodrug of the compound or the salt according to claim 1.

* * * * *